United States Patent [19]

Wada

[11] 4,381,923
[45] May 3, 1983

[54] ISOTOPE SEPARATION WITH AN INFRARED LASER

[76] Inventor: Kazuhiro Wada, c/o Kyoto University, Kohgaku-bu, Yoshida Honmachi, Sakyo-ku, Kyoto, Japan

[21] Appl. No.: 89,986

[22] Filed: Oct. 31, 1979

Related U.S. Application Data

[63] Continuation-in-part of Ser. No. 8,588, Feb. 1, 1979, abandoned, which is a continuation of Ser. No. 779,762, Mar. 21, 1977, abandoned.

[30] Foreign Application Priority Data

Sep. 20, 1976 [JP] Japan .................... 51/113256

[51] Int. Cl.³ ............................. B01D 59/00
[52] U.S. Cl. ...................... 23/293 R; 423/3
[58] Field of Search ............ 423/3; 250/492 R

[56] References Cited

U.S. PATENT DOCUMENTS 4,010,100 3/1977 Suslick ........................... 55/67
4,032,419 6/1977 Bernstein .................. 204/157.1 R

FOREIGN PATENT DOCUMENTS 2806162 8/1978 Fed. Rep. of Germany ...... 423/259
2718030 10/1978 Fed. Rep. of Germany .
53-34278 9/1978 Japan ................................ 423/2

OTHER PUBLICATIONS

Karlov, N. V. et al., "Selective Evaporation of Frozen Gases by Laser Radiation", *JETP Lett.* 24(5): 258–61, Sep. 5, 1976.

Hochstrasser, R. M. et al., "Isotopically Selective Photochemistry in Molecular Crystals", *J. Am. Chem. Soc.*, 97(16): 4760–2, Aug. 6, 1975.

Ambartsumyan, R. V. et al., *JETP Lett.*, 24(5): 256–8, Sep. 5, 1976, "Dissociation of Molecules Isolated in a Matrix by Infrared Radiation".

Paine, R. T. et al., "Vibrational Spectroscopy of Matrix-Isolated $UF_6$ & $UF_5$", *J. Chem. Phys.*, 64(7): 3081–3, Apr., 1976.

*Primary Examiner*—Deborah L. Kyle

[57] ABSTRACT

An isotope separation is conducted by diluting a mixture containing the object isotope compound being enriched with an inert diluent gas which is transparent to the irradiated infrared rays; condensing the isotope compounds together with the inert diluent gas on a cold plate and irradiating specific infrared rays absorbed only by the object isotope compound to selectively excite the object isotope compound.

20 Claims, 5 Drawing Figures

ISOTOPE SEPARATION WITH AN INFRARED LASER

CROSS-REFERENCE TO RELATED APPLICATIONS

This application is a continuation-in-part application of Ser. No. 008,588, filed Feb. 1, 1979, which is in turn a continuation of Ser. No. 779,762, filed Mar. 21, 1977, both now abandoned.

BACKGROUND OF THE INVENTION

1. Field of the Invention

The present invention relates to isotope separation using an infrared laser for enriching the object isotope compound by selective excitation.

2. Description of the Prior Art

In general, differences of physical or chemical properties between isotope substitution products are small, especially, the differences for isotope compounds having a large molecular weight such as uranium compounds are remarkably small. Accordingly, in the conventional statistical separation for enriching the object uranium isotope compound, the change of concentration of the object isotope compound attained by one stage of the separation process is quite small and, therefore, it is necessary to repeat a large number of stages of the separation process in order to obtain the desired enriched concentration of the object uranium isotope compound. The cost for enriching the object isotope compound increases substantially in proportion to the number of stages of the separation process, which can be decreased depending upon a commensurate increase in the separation factor.

The separation factor is the ratio of relative isotopic abundance in the separation process as follows:

Separation factor =

| Concentration of object isotope compound after separation process | Concentration of residual / isotope compound after separation process |
|---|---|
| Concentration of object isotope compound before separation process | Concentration of residual / isotope compound before separation process |

The separation factor is considered as a measure of the degree of separation in concentration in the separation process. A large separation factor makes the size of the whole facilities so small that the cost for enriching the object isotope compound can be reduced.

Various separation processes have been studied to reduce the cost for uranium isotope separation. One of these separation processes is an isotope separation using a laser wherein laser rays absorbed only by the object component in a mixture containing the isotope compounds (including isotope element) are irradiated to selectively excite the object isotope compound whereby the excited isotope compound is separated by means of a desired reaction. In principle, a large separation factor can be expected and this separation process is expected to reduce the cost for enriching the object isotope compound.

The laser isotope separation processes can be classified from the viewpoint of the wavelength of laser rays used for the selective excitation into (1) visible laser and (2) infrared laser.

In comparing visible lasers and infrared lasers for uranium isotope separation, the isotope shift of the absorbed wavelength in uranium vapor is as small as 0.08 Å and the available power is small in the separation with a visible laser. Moreover, energy dissipation from the selectively excited isotope compound to another isotope compound is large because of the high exciting energy levels.

On the other hand, when the isotope compound is selectively excited with the infrared laser, the isotopic shift of the absorbed wavelength is 0.65 cm$^{-1}$ in 625.5 cm$^{-1}$ for the $\nu_3$ vibration of gaseous uranium hexafluoride. The isotopic shift is about 100 times that for the visible laser and the uranium isotope compound can be more easily discriminated. Moreover, a high output laser can be used. However, the specific infrared energy is relatively small, several kcal/mole, while a conventional chemical reaction requires several tens kcal/mole. Accordingly, it is necessary to separate the selectively excited molecules by a suitable reaction.

In the past, it has been proposed to conduct the reaction in the presence of a decomposable gas. However, in this process, it is difficult to prevent direct or indirect energy transfer from the excited molecules to the molecules which should not be excited, because of collisions between gaseous molecules.

SUMMARY OF THE INVENTION

It is an object of the present invention to provide an isotope separation which has the advantages of the infrared laser with an improvement in the discrimination of the isotopic compounds.

It is another object of the present invention to provide an isotope separation for enriching the object isotope compound by irradiating with infrared rays while preventing energy dissipation and making the selectively excited molecules in the condensed matter perform such a reaction as a migration or a sublimation where the activation energy is relatively small.

The foregoing and other objects of the present invention have been attained by an isotope separation which comprises diluting a mixture of gaseous compounds containing the object isotope compound being enriched with an inert diluent gas which is transparent to the irradiated infrared rays, condensing the isotope compounds on a cold plate and irradiating with specific infrared rays absorbed only by the object isotope compound to selectively excite the object isotope compound.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The raw material containing the object isotope compound which should be enriched is mixed with an inert diluent gas which is transparent to the specific infrared rays to be used or they are separately, simultaneously or alternatively fed through the nozzle and the isotope compounds and the inert diluent gas are condensed on a cold plate at a temperature suitable for condensing the inert diluent gas in a vacuum chamber and then the specific infrared rays having a narrow linewidth and a specific wave number which is absorbed only by the object isotope compound (one or more isotope compound) in the condensed material layer are applied to the condensed material layer to selectively excite the object isotope compound.

In the condensed material layer formed on the cold plate, it is considered that molecules of the isotope compounds are separated from each other by the inert diluent gas molecules and are immobilized. When molecules of the isotope compounds are separated from each other, the dissipation of energy to molecules of the other isotope compound is decreased whereby the selective excitation of the object isotope compound can be effectively attained.

When the mutual interference of the isotope compounds is prevented, the peak of the infrared absorption becomes sharp whereby the peak of the object isotope compound can be more easily discriminated for those of others.

The mutual interference of the isotope compounds is reduced and the peak of the infrared absorption becomes sharp and the degree of absorption is increased by cooling the raw material to low temperature.

The infrared source can be an apparatus based on any principle to satisfy the conditions of wavelength and linewidth which is absorbed only by the object isotope compound, and it is preferable to use a laser oscillator from the viewpoint of height of the optical density and monochromatic property.

When molecules of the object isotope compound fixed in the condensed layer on the cold plate surrounded by the condensed inert diluent molecules are excited by the infrared rays having the specific absorption wavelength, the excited molecules of the isotope compound are moved to the surface of the cold plate if the exciting energy is enough to break the barrier to movement which is formed by the diluent molecules.

The movement of the excited molecules of isotope compound to the surface of the cold plate is caused by the temperature gradient from the condensed layer surface at a higher temperature to the cold plate surface at a lower temperature.

On the other hand, the inert diluent gas molecules are sublimated from the condensed layer surface at the vapor pressure corresponding to the temperature at the condensed layer surface. At the same time, the fixed isotope compound molecules surrounded by the inert diluent molecules become free to be separated in vacuum.

In the phenomenon, the concentration distribution of the non-excited isotope compound is uniform and the concentration of the isotope compound is the same with that of the raw material, whereas the excited isotope compound is moved to the cold plate to reduce the concentration of the excited isotope compound at the condensed layer surface. As a result, the isotope compounds separated from the condensed layer contain an increased concentration of the non-excited isotope compound in comparison with that of the raw material.

On the other hand, the isotope compounds remaining in the condensed layer and on the cold plate contain an increased concentration of the excited object isotope compound.

Accordingly, when the gas separated from the condensed layer during the infrared irradiation and the condensed isotope compounds remaining on the cold plate after the infrared irradiation are separately collected, the former contains an increased concentration of the non-excited isotope compound and the latter contains an increased concentration of the excited isotope compound.

The separation process of the present invention can be applied for separation of uranium isotope compounds.

In the process of uranium isotope separation, the chemical form of the object uranium isotope compound is not converted and a chemically active compound is not produced. Accordingly, the separation process is advantageous from the viewpoint of a corrosion of the apparatus.

Moreover, it is possible to use uranium hexafluoride $UF_6$ which can be easily obtained in gaseous form, as the uranium isotope compounds whereby the operations in the separation process such as supply of the raw material and collection of the product can be easily attained.

In accordance with the process of the invention for enriching the uranium 235 ($^{235}U$), the uranium hexafluoride is diluted with 50 to 1000 volumes of an inert diluent gas such as argon, kripton, xenon, nitrogen, carbon monoxide, etc., and the mixed gas is blown against a cold plate made of a metal such as aluminum, copper, nickel, stainless steel or an ionic crystal such as barium fluoride or KRS-5 iodide which is kept at a temperature lower than $-196°$ C. to form a solid layer.

The infrared rays having the specific wave number corresponding to the inherent absorption wavelength of the solid uranium isotope hexafluoride which is given by the kind of inert diluent gas (wave number width is less than isotope shift) are directed onto the same sample at an intensity of more than 0.1 W per 1 mg of the uranium hexafluoride.

Preferably, the uranium hexafluoride is diluted with 100 to 1000 volumes of inert gas and the mixed gas is blown onto a cold plate made of aluminum or copper which is kept at a temperature below $-210°$ C., and the infrared rays are irradiated at an intensity of more than 0.5 W per 1 mg of the uranium hexafluoride.

In the optimum embodiment, the uranium hexafluoride is diluted with 1000 volumes of inert gas and the mixed gas is blown onto a cold plate made of copper which is kept at $-220°$ C. and the infrared rays having a linewidth of less than 0.5 cm$^{-1}$ are irradiated at an intensity of more than 1 W per 1 mg of the uranium hexafluoride.

Since the emission lines of high power infrared lasers are discrete and not always coincident with an absorption line of the isotopic compounds to be separated, special conditions of the irradiation must be chosen to produce coincidence of absorption and emission lines. For the case of isotopic compounds immobilized in inert gas matrices, the following considerations illustrate how this may be achieved.

UF$_6$ molecules having several fundamental modes in which the isotopic shift attributable to the uranium atom appears in the $\nu_3$ and $\nu_4$ modes. The peak position of the absorption lines corresponding to these fundamental modes and combination bands including the $\nu_3$ mode are shown in Table 1. The peak position of the infrared absorption is slightly different depending upon the sample condition. Therefore, the peaks are listed for several sample conditions.

TABLE 1

| | INFRARED ABSORPTION BANDS OF $^{238}$UF$_6$ | | | | | |
|---|---|---|---|---|---|---|
| Absorption Bands | Peak Position cm$^{-1}$ | 300° K. vapor Isotope Shift cm$^{-1}$ | Intensity a × 10$^4$ | 10° K. AR Matrix cm$^{-1}$ | 10° K. Xe Matrix cm$^{-1}$ | Supersonic Expansion cm$^{-1}$ |
| $\nu_4$ | 186.2 | 0.16 | 100 | 183.5 | | |
| $\nu_3$ | 625.5 | 0.65 | 2000 | 619.3 | 617.0 | 627 (?) |
| $\nu_3 + \nu_5$ | 821 827 | 0.65 | 1.9 | 819.0 | | |
| $\nu_2 + \nu_3$ | 1156.9 | 0.65 | 4.7 | 1148.9 | | |
| $\nu_1 + \nu_3$ | 1290.0 | 0.65 | 4.1 | 1285.1 | | | a: peak absorbance/path length (cm) × vapor pressure (Torr)

The $\nu_3$ peak of gaseous $^{238}$UF$_6$ at room temperature appears at 625.5 cm$^{-1}$ (15.99 μm), where the isotope shift from $^{238}$UF$_6$ to $^{235}$UF$_6$ is 0.65 cm$^{-1}$. It is necessary for uranium enrichment to cool the sample to low temperature in order to make the absorption line sharp so that the isotopes can be distinguished.

There are two ways to cool the target gas molecules, one by supersonic expansion cooling of a gaseous sample and the other by isolation of the molecules with a low temperature matrix.

In the case of supersonic expansion cooling, the absorption lines shift toward the higher wavenumber side compared with those of a gaseous sample at room temperature. The definite peak position has not been published, however, it is estimated that the $\nu_3$ peak of $^{238}$UF$_6$ will appear at about 627 cm$^{-1}$ (16.0 μm). Whereas the peak shifts toward lower wavenumbers in matrix isolation; the $\nu_3$ peak of $^{238}$UF$_6$ appears at 619.3 cm$^{-1}$ (16.15 μm) with an Ar matrix and at 617.0 cm$^{-1}$ (16.21 μm) in a Xe matrix.

The isotope shift is considered to be the same for each sample so that the $\nu_3$ peak of $^{235}$UF$_6$ will appear at 626.15 cm$^{-1}$ (15.97 μm) for a gaseous sample at room temperature, at around 627.5 cm$^{-1}$ (15.9 μm) for a sample cooled by supersonic expansion, at 619.95 cm$^{-1}$ (16.13 μm) for an isolated sample with Ar matrix and at 617.65 cm$^{-1}$ (16.19 μm) for a sample with Xe matrix.

One method for producing coincidence of the emission lines of the laser used to irradiate the isotope compounds to be separated and the absorption lines of the isotopes in those compounds is to use a tunable laser and adjust the frequency of the emission line to coincide with the absorption line of the isotope. Many tunable lasers are known and some of them can be tuned to emit light of the proper wavelength for absorption by isotopes of uranium. A review of the tunable lasers having emission in the 16 μm region of the spectrum is found in Yamanaka, "Present Status of 16-μm Lasers for Laser Isotope Separation of UF$_6$", 1976. Table III of this publication discloses several lasers capable of emitting radiation in the region of the spectrum required for separation of uranium isotopes in isotopic compounds immobilized in noble gas matrices. Suitable lasers are the CO laser-CO$_2$ difference frequency generation laser using a CdGeAs$_2$ mixer, the dye laser-dye laser difference frequency generation laser using a AgGaS$_2$ mixer, the HF laser pumped CdSe optical parametric oscillator, and the InSb spin flip Raman laser using a 12.81 μm pump. Such lasers are suitable for use when the isotope compounds are immobilized in pure matrices of argon, xenon or the like.

It is also possible to use a line selective laser and adjust the absorption line frequency to match the emission frequency of the laser. Thus, it is known that a CF$_4$ laser which is optically pumped with a CO$_2$ laser generates twelve lines in the 16 μm region. These laser lines are shown in Table 2 together with absorption lines of UF$_6$ isotopes under different sample conditions. It can be seen from Table 2 that no laser line coincides with any $\nu_3$ absorption lines of $^{235}$UF$_6$ or $^{238}$UF$_6$.

TABLE 2

| CF$_4$ LASER LINES IN 16 μm REGION AND UF$_6$ $\nu_3$ ABSORPTION LINES | | | | |
|---|---|---|---|---|
| Laser Lines | | Absorption Lines | | |
| No. | cm$^{-1}$ | cm$^{-1}$ | | Sample Condition |
| (1) | 653.32 | | | |
| (2) | 649.3 | | | |
| (3) | 646.1 | | | |
| (4) | 643.23 | | | |
| (5) | 642.4 | | | |
| (6) | 640.73 | | | |
| (7) | 631.15 | | | |
| (8) | 631.05 | | | |
| (9) | 631.12 | | | |
| | | 627.5 | $^{235}$UF$_6$ | supersonic expansion cooling |
| | | 627 | $^{238}$UF$_6$ | supersonic expansion cooling |
| | | 626.15 | $^{235}$UF$_6$ | gaseous sample at 300° K. |
| | | 625.5 | $^{238}$UF$_6$ | gaseous sample at 300° K. |
| | | 619.95 | $^{235}$UF$_6$ | Ar matrix isolation |
| | | 619.3 | $^{238}$UF$_6$ | Ar matrix isolation |
| (10) | 618.11 | | | |
| | | 617.65 | $^{235}$UF$_6$ | Xe matrix isolation |
| | | 617.0 | $^{238}$UF$_6$ | Xe matrix isolation |
| (11) | 615.06 | | | |
| (12) | 611.99 | | | |

The peak shift from gaseous UF$_6$ at room temperature toward the higher wavenumber side by supersonic expansion cooling is limited, and to make the peak sharp, it is preferable to cool the sample down to the limited value.

In the case of matrix isolation, the sharpness of the peak mainly depends on the dilution ratio of the sample to the matrix and on the matrix temperature, and it is not affected by the matrix species provided the matrix is inert gas molecules.

The peak position of the absorption line of a matrix isolated sample differs in different matrices as shown in Tables 1 and 2. Accordingly, it is possible to adjust the position of the absorption line to fit the laser line by using a mixed matrix and by changing the mixing ratio of the matrix.

In order to illustrate the peak shift with a mixed matrix, the dependence of the $SF_6$ $\nu_3$ peak position on the mixing ratio is observed by using several mixed matrices of noble gases. The sample was prepared by diluting $SF_6$ with a mixture of two noble gases and blowing it against a $BaF_2$ cold plate to be solidified. The $\nu_3$ peak position of $SF_6$ dispersed in the solidified noble gas mixture was measured with an infrared absorption spectrometer.

Figure 1:
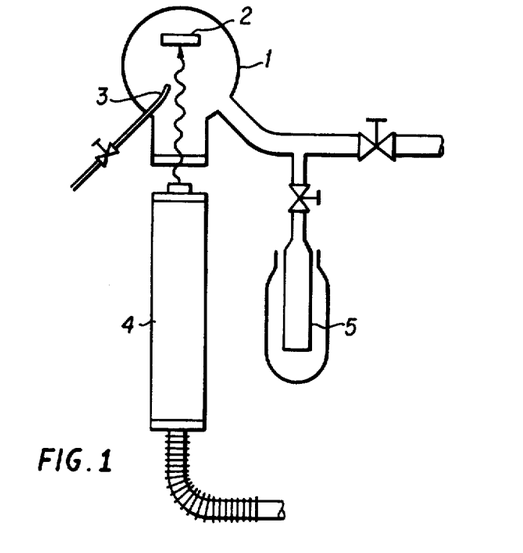
FIG. 1 is a schematic view of an apparatus for a batch separation process according to this invention.
Figure 2:
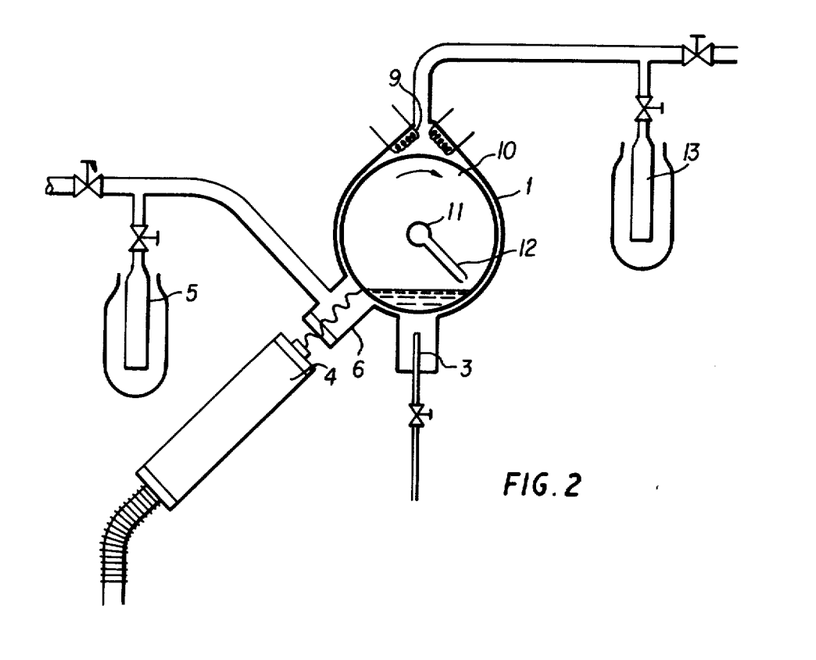
FIG. 2 is a schematic view of an apparatus for a continuous separation process according to this invention.
Figure 3:
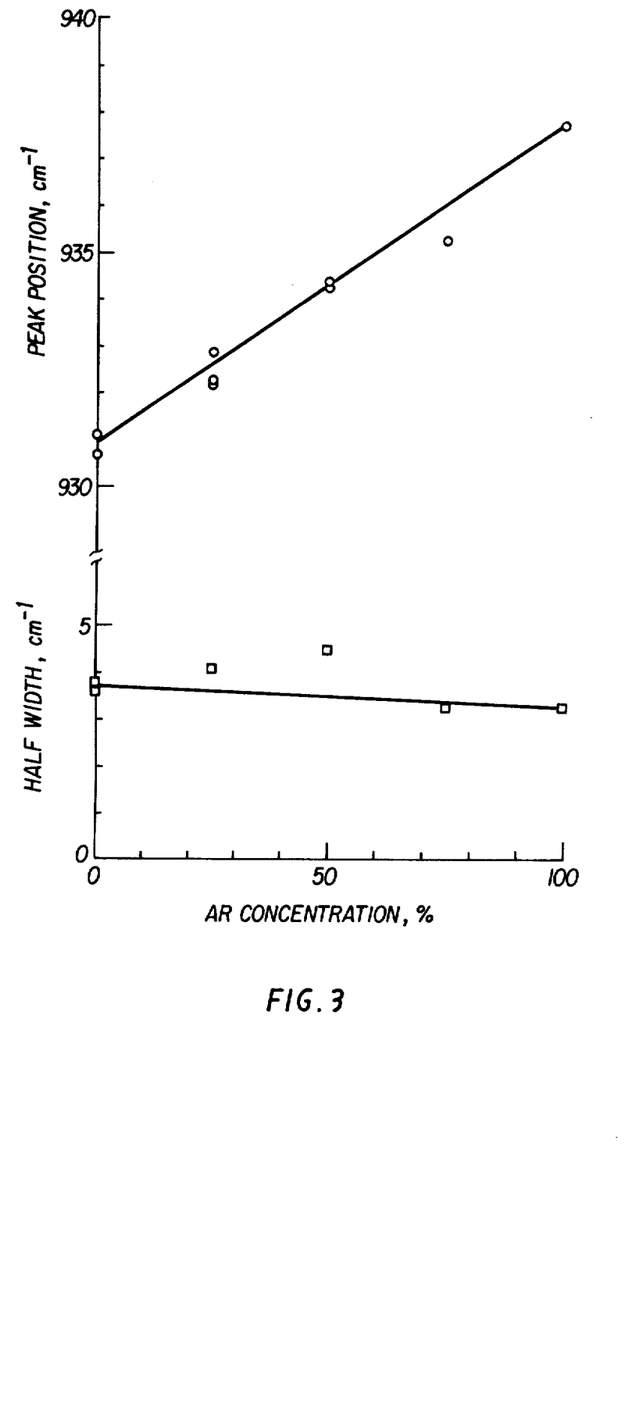
FIG. 3 shows the variation in the peak position and peak half width for the $^{32}SF_6$ $\nu_3$ peak with the mixing ratio in an Ar-Xe mixed matrix.
Figure 4:
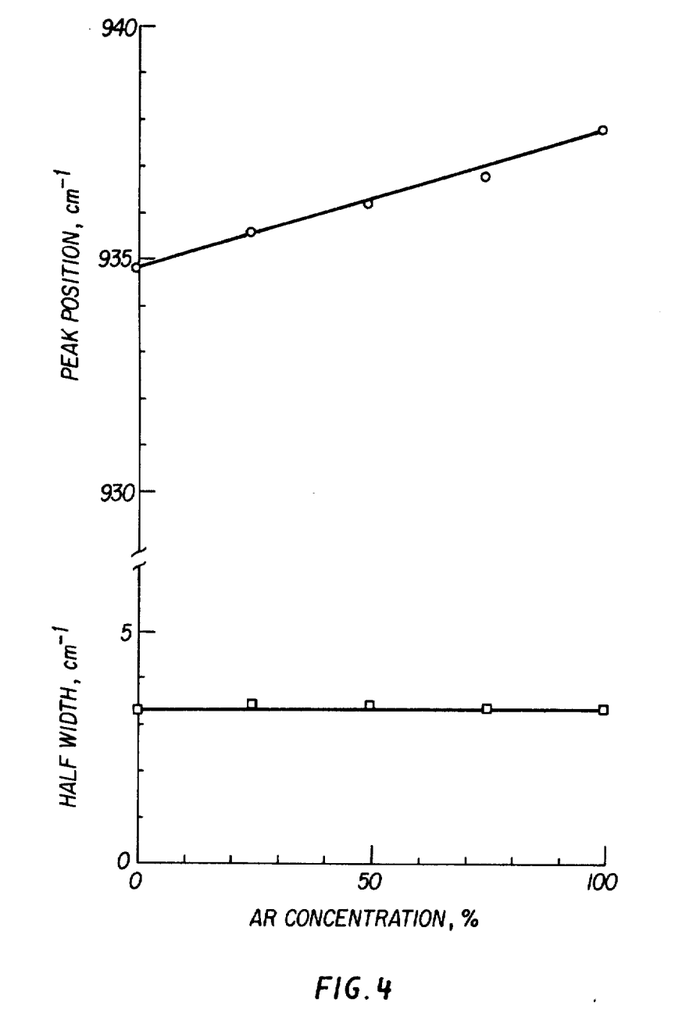
FIG. 4 shows the variation in the peak position and peak half width for the $^{32}SF_6$ $\nu_3$ peak with the mixing ratio in an Ar-Kr mixed matrix.
Figure 5:
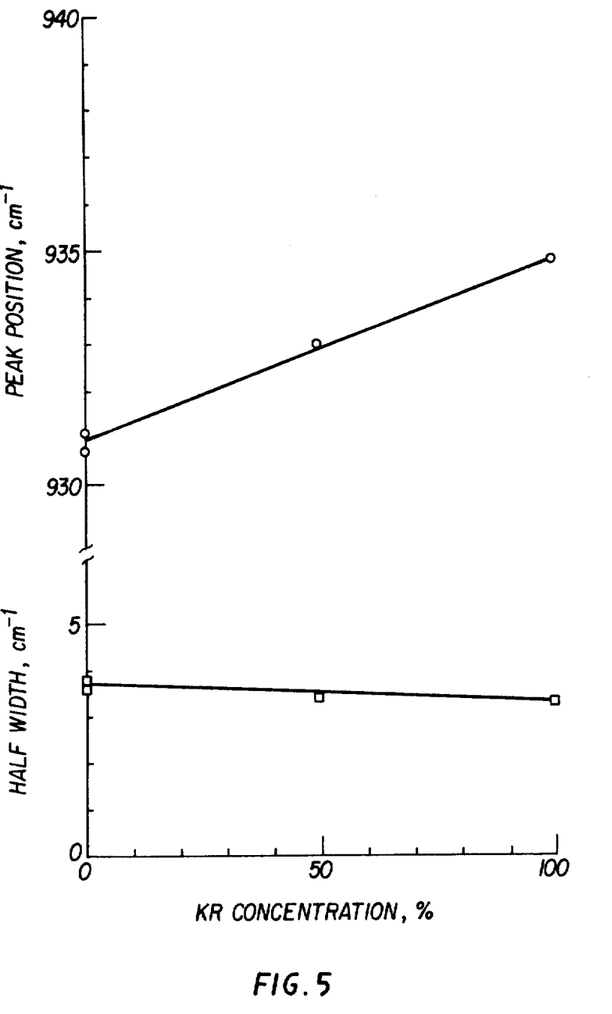
FIG. 5 shows the variation in the peak position and peak half width for the $^{32}SF_6$ $\nu_3$ peak with the mixing ratio in a Kr-Xe mixed matrix.

FIG. 1 shows the variation in the peak position and the half width of the $^{32}SF_6$ $\nu_3$ peak with varying Ar concentration in an Ar-Xe mixed matrix. Observation with Ar-Kr and with Kr-Xe mixed matrices were also performed, and the results are shown in FIGS. 2 and 3, respectively. It can be seen that the peak is shifted linearly over a limited wavenumber range bounded by the pure matrices, by changing the mixing ratio of the mixed matrix, whereas the peak width is almost unchanged.

The absorption peak of $UF_6$ can also be shifted over a limited wavenumber range by changing the mixing ratio of the mixed matrix.

From the data in Table 2, it is evident that the 10th line of the optically pumped $CF_4$ laser (618.11 cm$^{-1}$) lies between the $\nu_3$ absorption lines of matrix isolated $UF_6$ in Ar and Xe, or in Kr and Xe. And the $\nu_3$ peak positions of $^{235}UF_6$ and $^{238}UF_6$ in Kr matrix can be estimated from the spectral data of $SF_6$ isolated in matrices shown in Table 3.

TABLE 3

THE $\nu_3$ ABSORPTION PEAKS OF $SF_6$ AND $UF_6$ ISOTOPES IN NOBLE GAS MATRICES

| Matrix | $^{32}SF_6$ cm$^{-1}$ | $^{238}UF_6$ cm$^{-1}$ | $^{235}UF_6$ cm$^{-1}$ |
|---|---|---|---|
| Ar | 937.8 | 619.3 | 619.95 |
|  | 6.9 | 2.3 | 2.3 |
| Kr | 934.8 | 618.3 | 618.95 |
|  | 3.9 | 1.3 | 1.3 |
| Xe | 930.0 | 617.0 | 617.65 |

Thus, by applying the linearity rule of peak shift to the matrix isolated $UF_6$ target, the mixing ratios of the mixed matrix can be chosen to adjust the $\nu_3$ peak of $^{235}UF_6$ and $^{238}UF_6$ to the 10th line of the $CF_4$ laser. The result is shown in Table 4. That is, to adjust the $^{235}UF_6$ $\nu_3$ peak to the 10th line of $CF_4$ laser, one may use a 20%Ar-80%Xe or a 35.4%Kr-64.6%Xe mixed matrix. To adjust the $^{238}UF_6$ $\nu_3$ peak to that laser line, a 48.3%Ar-51.7%Xe or 85.4%Kr-14.6%Xe mixed matrix can be used.

TABLE 4

CONCENTRATIONS OF LIGHTER COMPONENTS IN MIXED MATRICES TO ADJUST THE $\nu_3$ PEAK OF $UF_6$ ISOTOPES TO 618.11 cm$^{-1}$ LASER LINE

| Isotopic Compound | Mixed Matrix | Concentration |
|---|---|---|
| $^{235}UF_6$ | Ar—Xe | 20% Ar |
| $^{238}UF_6$ | Ar—Xe | 48.3% Ar |
| $^{235}UF_6$ | Kr—Xe | 35.4% Kr |
| $^{238}UF_6$ | Kr—Xe | 85.4% Kr |

The differences in mixing ratio between the values which adjust the absorption lines for $^{235}UF_6$ and $^{238}UF_6$ to the laser line are large enough to be readily achieved in practice.

Thus, the selected $UF_6$ isotope can be selectively excited in the photomigration laser isotope separation process with an optically pumped $CF_4$ laser, by using $UF_6$ in a mixed matrix as the target and by changing the mixing ratio of the matrix so as to adjust the absorption peak of the selected $UF_6$ isotope to the laser line.

Having generally described this invention, a further understanding can be obtained by reference to certain specific examples which are provided herein for purposes of illustration only and are not intended to be limiting unless otherwise specified.

EXAMPLE

A KRS-5 crystal is mounted as a cold plate in a vacuum chamber and cooled to a temperature of $-220°$ C. Gaseous $UF_6$ is diluted with 1000 volumes of mixture of 20% argon and 80% xenon and the mixture of gases is directed through a nozzle onto the cold plate where it condenses to form a mixed gas matrix containing $UF_6$ molecules. The matrix is irradiated with the 618.11 cm$^{-1}$ line of an optically pumped $CF_4$ gas laser, whereby the $^{235}UF_6$ molecules selectively absorb the radiation and become excited. The excited $^{235}UF_6$ molecules thus migrate through the matrix toward the cold plate. Accordingly, the region of the matrix closer to the surface becomes depleted in $^{235}UF_6$ molecules. The condensed matrix is then allowed to sublime whereby the surface layers are first removed and with them the $UF_6$ molecules contained in the surface layers of the matrix. Since some of the $^{235}UF_6$ molecules have migrated from the surface layers, the ratio of $^{238}UF_6$ to $^{235}UF_6$ is greater in the gas sublimed than in the condensed layer remaining on the cold plate. Thus, the first portion of gas sublimed from the cold plate is collected to obtain material enriched in $^{238}UF_6$.

Subsequently, the temperature of the cold plate is increased to vaporize the remaining condensed layer and the evolved gases are collected to obtain material enriched in $^{235}UF_6$.

The same procedure may be repeated using the material enriched in $^{235}UF_6$ to obtain material further enriched in $^{235}UF_6$. Evidently, as many repetitions of the process may be performed as needed to produce $UF_6$ containing the desired concentration of $^{235}U$.

If desired, a mixed matrix can be chosen which shifts the $\nu_3$ absorption of $^{238}UF_6$ to coincide with the 618.11 cm$^{-1}$ line of the $CF_4$ laser. Such a matrix might be as shown in Table 4, a mixture of 48.3% argon and 51.7% xenon. In this case the molecules of $^{238}UF_6$ will absorb the laser radiation and move through the matrix toward the cold plate. Subsequent separate vaporization of the matrix layers near the surface and those close to the cold plate will yield fractions enriched in $^{235}UF_6$ and $^{238}UF_6$ respectively.

A multi-stage separation process is thus seen to require the successive steps of cooling, condensation and solidification of the matrix, irradiation and vaporization and separate collection of the gases from the surface portion of the matrix and from the portion of the matrix adjacent to the cold surface.

Referring to the drawings, the concept of the apparatus used for the separation process of the present invention will be illustrated.

The successive steps of the process may be carried out in a batch process. FIG. 1 is a schematic view of an apparatus for a batch separation process. A cold plate (2) is held in a vacuum chamber (1) and a mixed gas of the isotope compounds diluted with an inert diluent gas is blown through a nozzle (3) against the cold plate (2) to form a solid condensed layer on the cold plate (2). An infrared laser (4) having the specific wave number and linewidth is applied to the solid condensed layer. The gas separated during the irradiation with the infrared laser is collected in the cold trap (5) cooled with a coolant, to obtain the product containing the increased concentration of the non-excited isotope compound.

After irradiation with the infrared laser, the collector of the cold trap (5) is replaced with a new collection vessel and the remaining solid condensed layer on the cold plate is vaporized by increasing the temperature and collected in the fresh collection vessel (5) to obtain the product containing the increased concentration of the isotopic compound which absorbed the infrared radiation.

The separation process can also be carried out in a continuous operation by forming a circular cold plate or a cylindrical cold plate in a vacuum chamber equipped with a cooling part, a blowing and condensing part, an infrared laser irradiating part and a temperature rising and separating part around the vacuum chamber.

FIG. 2 is a schematic view of an apparatus for a continuous separation process. A cylindrical cold drum (10) is held in vacuum chamber (1) with a horizontal rotary axis and is rotated around a hollow axis (11) in the arrow direction. A coolant is fed through a nozzle (12) disposed on the hollow axis and is kept at the bottom of the cold drum to cool the bottom. A mixed gas of the isotope compounds diluted with an inert diluent gas is blown through a nozzle (3) against the outer surface of the drum to condense the mixed gas and to form a solid condensed layer. The solid condensed layer is exposed to infrared laser radiation from laser (4) through passage (6). The gas separated during the irradiation with the infrared laser is collected in a cold trap (5). The remaining condensed layer on the cold drum (10) is turned and is heated by a heater (9). The separated gas is collected in a cold trap (13). As the result, the object isotope compound excited by the infrared laser is enriched and collected in the cold trap (13). The other isotope compound is enriched and collected in the cold trap (5).

The separation process of the present invention has been illustrated for the separation of uranium 235 hexafluoride from uranium hexaflouride. Likewise, the separation of boron 11 trichloride from boron trichloride is also accomplished by using xenon as an inert diluent gas to dilute boron trichloride to 100 times and condensing the diluted gas on a cold plate made of barium fluoride at the liquid nitrogen temperature and irradiating with an infrared laser (carbon dioxide gas laser) (10.6 μm wavelength) to excite and to enrich $^{11}BCl_3$ on the cold plate.

The separation of other isotopic compounds can also be accomplished by the same manner. The separation of gaseous isotopic compounds is especially suitable for the separation process of the present invention. The specific wave number of the infrared rays for the irradiation can be easily determined according to the infrared absorption spectrum of the mixed gas of the isotope compounds diluted with an inert diluent gas and condensed on a cold plate.

Having now fully described this invention, it will be apparent to one or ordinary skill in the art that many changes and modifications can be made thereto without departing from the spirit or scope of the invention set forth herein.

What is claimed as new and intended to be covered by Letters Patent is:

1. A method of separating isotopes using an infrared laser, comprising:
   diluting a gaseous isotopic mixture of compounds from which a specific isotope compound is to be separated from all other isotope compounds with an inert diluent gas which is transparent to the infrared radiation from said laser;
   condensing said isotopic mixture with the diluent gas as a condensed layer on a cold surface; and
   irradiating said condensed gases with infrared radiation from said laser of a wave length which selectively excites the isotope compound desired to be separated, thereby achieving the desired separation by the migration of the energized isotope compound toward the cold surface.

2. The method of claim 1, wherein said condensed layer is irradiated by infrared radiation of a specific wave number and narrow linewidth which excites only said specific isotope compound having a corresponding infrared absorption spectrum of the mixed gas condensed on a cold plate.

3. The method of claim 2, wherein in said condensed layer the molecules of isotope compounds are separated by condensed inert gas molecules and wherein at the condensed gas layer the molecules of the specific isotope compound are excited and migrate to the cold surface while the remaining isotope compounds which are not excited evaporate into the gas phase, thereby achieving enrichment of the desired specific isotope compound at the cold surface.

4. The method of claim 1, wherein the mixture of isotope compounds has an adequate vapor pressure to be handled at about room temperature and is fixed in the condensed gas layer with the inert diluent gas at a temperature where the inert diluent gas is solidified.

5. The method of claim 1, wherein the specific isotope compound is uranium 235 hexafluoride.

6. The method of claim 1, wherein the wave number and linewidth of the infrared radiation are determined by the infrared absorption spectrum of the mixture of the specific isotope compound and the inert diluent gas condensed on said cold plate.

7. The method of claim 1, wherein the condensed layer remaining after irradiation is vaporized by heating and the gas mixture obtained containing an enriched amount of said specific isotope compound is repeatedly subjected to the process of claim 1 to achieve a product substantially enriched with said specific isotope compound.

8. The method of claim 1, wherein the separation of uranium 235 hexafluoride from a uranium isotope hexafluoride mixture is achieved by irradiating a mixture of uranium isotope hexafluoride compounds with infrared rays from a $CF_4$ laser having a wave number of 618.11 $cm^{-1}$, said diluent gas being a mixture selected from the group consisting of mixtures of argon and xenon, and krypton and xenon, the proportions of the gases in said mixtures being chosen to adjust the absorption frequency of the desired uranium hexafluoride isotope compound to the same wavelength as the infrared rays from the laser.

9. The method of claim 8, wherein said diluent gas is a mixture of 20% argon and 80% xenon.

10. The method of claim 8, wherein said diluent gas is a mixture of 48.3% argon and 51.7% xenon.

11. The method of claim 8, wherein said diluent gas is a mixture of 35.4% krypton and 64.6% xenon.

12. The method of claim 8, wherein said diluent gas is a mixture of 85.4% krypton and 14.6% xenon.

13. The method of claim 1, wherein said specific isotope compound is $^{11}BCl_3$.

14. A method of separating $^{11}B$ compounds from an isotopic mixture of boron compounds with laser infrared light, which comprises:
    diluting a gaseous isotopic mixture of boron compounds containing $^{11}B$ from which said $^{11}B$ compound is to be separated with an inert diluent gas which is transparent to the infrared radiation from said laser;
    condensing said isotopic mixture with the diluent gas as a condensed layer on a cold surface; and
    irradiating said condensed layer with infrared radiation from said laser of a wavelength which selectively excites said $^{11}B$ isotopic compound, thereby achieving the desired separation by the migration of the energized $^{11}B$ isotope compound toward the cold surface.

15. The process of claim 14, wherein said isotopic mixture is a mixture of $^{10}B$ and $^{11}B$ trichloride compounds.

16. The method of claim 14, wherein said diluent gas is xenon and the exciting infrared laser light has a wavelength of 10.6 $\mu$m.

17. The method of claim 1, wherein said laser is a Co laser-$CO_2$ difference frequency generation laser using a $CdGeAs_2$ mixer.

18. The method of claim 1, wherein said laser is a dye laser-dye laser difference frequency generation laser using a $AgGaS_2$ mixer.

19. The method of claim 1, wherein said laser is a HF laser pumped CdSe optical parametric oscillator.

20. The method of claim 1, wherein said laser is an InSb spin flip Raman laser using a 12.81 $\mu$m pump.

* * * * *

UNITED STATES PATENT AND TRADEMARK OFFICE
CERTIFICATE OF CORRECTION

PATENT NO. : 4,381,923

DATED : May 3, 1983

INVENTOR(S) : Kazuhiro Wada

It is certified that error appears in the above-identified patent and that said Letters Patent is hereby corrected as shown below:

On the title page add:

-- [73] Assignee

Kyoto University　　Kyoto, Japan　--

Signed and Sealed this

Tenth Day of January 1984

[SEAL]

Attest:

GERALD J. MOSSINGHOFF

Attesting Officer　　　Commissioner of Patents and Trademarks